United States Patent [19]

Kanaoka et al.

[11] 4,447,563

[45] May 8, 1984

[54] ANAEROBICALLY CURABLE COMPOSITION AND PROCESS FOR PREPARATION THEREOF

[75] Inventors: Kunio Kanaoka; Takanori Okamoto; Hideaki Matsuda, all of Kagawa, Japan

[73] Assignee: Okura Kogyo Kabushiki Kaisha, Japan

[21] Appl. No.: 437,480

[22] Filed: Oct. 28, 1982

[30] Foreign Application Priority Data

Oct. 30, 1981 [JP] Japan .................................. 56-172814

[51] Int. Cl.³ .............................................. C08L 75/04
[52] U.S. Cl. .................................... 523/176; 524/718; 528/49; 528/52; 528/75
[58] Field of Search .......................... 528/49, 52, 75; 523/176; 524/718

[56] References Cited

U.S. PATENT DOCUMENTS 4,263,444 4/1981 Graham et al. ........................ 528/75

*Primary Examiner*—Maurice J. Welsh
*Attorney, Agent, or Firm*—Jacobs & Jacobs

[57] ABSTRACT

A novel anaerobically curable resin composition of one-part type is provided. The composition consists essentially of the following components (a), (b) and (c) in the specified amounts; the component (a) being a mixture of polymerizable components consisting of (i) an addition-reaction product of a polybutadiene-based liquid rubber, a polyisocyanate and a hydroxyl group-containing methacrylate, and (ii) a polymerizable methacrylate; the component (b) being a salt of o-benzoic sulfimide with a specified amine; and the component (c) being an ammonium or amine salt of an aminopolycarboxylic acid. The process for preparation of the composition comprises the step of adding the specified amounts of the aminopolycarboxylic acid or an alkali metal salt thereof and an ammonia water or a volatile organic amine to the component (a), the step of stirring and heating the mixture to remove volatile matters partly until the pH is decreased to 9 or lower, and the step of adding thereto the component (b).

18 Claims, No Drawings

ANAEROBICALLY CURABLE COMPOSITION AND PROCESS FOR PREPARATION THEREOF

BACKGROUND OF THE INVENTION

The present invention relates to a one-part type anaerobically curable composition which exhibits good storage stability and gives a cured resin having excellent elasticity and is environmentally safe since it does not require any irritating organic peroxide to provide a cured product, as well as a process for preparing such a curable composition.

There have been known a lot of anaerobically curable compositions which are liquid in air but bring about polymerization reaction upon isolating them from air and are cured to exhibit adhesive action. Utilizing such characteristics, these compositions are used in locking of bolts and nuts, fixing of bearings or shafts of motors, filling and repairing of pinholes in castings and the like instead of conventional mechanical means, to increase production efficiency and to save labor. Those compositions are composed of polymerizable monomers an organic peroxide, a curing accelerator and a gelling stabilizer, and are made up to balance the amounts of the accelerator and the stabilizer so that they can cure in a short time at room temperature in the form of a one-part composition. So, they do not require the troublesome steps such as mixing two liquid components, pretreatment by curing accelerator and heating in the working operation, but can be bonded by simply filling them into a gap between metal materials. Thus, they can be said to be a very efficient adhesive. However, because the polymerizable monomer to be used is normally a polymethacrylate having a low molecular weight, the resulting cured resin has the defect in that it has poor elasticity although it is solid and tough. Thus, such a composition was difficult to apply to parts where there was a large change in temperature or where resistance to bending was required. Also, there have been problems with respect to bad odors and skin-irritating properties, because a considerable amount of organic peroxides are used therein as a curing agent.

To provide anaerobically curable compositions which cure to resilient resins, it has been proposed to dissolve solid rubbers in such compositions as shown in Japanese Patent Publication Nos. 25938/75 and 28177/79 as well as Japanese Laid-open Patents Nos. 4243/76 and 65065/81 and the like. In order to provide cured products with resilient properties, however, it is necessary to dissolve a considerably large amount of rubbers therein. When such a large amount of rubber is used, the resulting composition itself may be solid instead of liquid. Moreover, the rubber itself has a poor or no polymerizable property, and thus the resulting composition results inevitably in an adhesive having a slow adhesion speed.

On the other hand, the conventional anaerobically curable compositions often use an organic peroxide as a curing agent. Such organic peroxides, however, have defects in that they have bad odors, and sometimes irritate human skin.

The salt of o-benzoic sulfimide with an amine represented by the general formula,

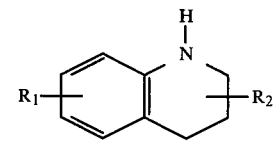

(wherein $R_1$ and $R_2$ are hydrogen or methyl group, respectively) is disclosed in Japanese Patent Publication Nos. 39480/78, 47266/78, 28176/79 and 1958/80 Specifications. This salt acts as an effective curing agent or accelerator for the composition of the present invention. The compound, o-benzoic sulfimide, which is one component of the salt used as a curing agent, is better known by the name, saccharin.

SUMMARY OF THE INVENTION

The composition according to the present invention is a one-part type anaerobically curable composition which is free of any organic peroxy initiators and which has good storage stability and produces cured products with excellent elasticity. The composition is also environmentally sound.

The composition according to the present invention consists essentially of (a) 100 parts by weight of a polymerizable mixture consisting of the following (i) and (ii);
  (i) 20 to 90% by weight of a urethane polymethacrylate composed of an addition-reaction product of
    (1) a polybutadiene-based liquid rubber containing hydroxyl groups in its molecule and not less than 70% of 1,4-bonds
    (2) a polyisocyanate compound, and
    (3) a hydroxyl group-containing methacrylate in such a ratio that the resulting mixture contains OH groups and NCO groups approximately in an equivalent amount, and
  (ii) 80 to 10% by weight of a polymerizable methacrylate,
(b) 0.1 to 5.0 parts by weight of a salt of o-benzoic sulfimide with an amine represented by the following general formula I:

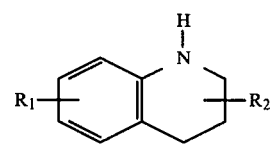

, wherein, $R_1$ and $R_2$ each independently stand for hydrogen or methyl group, and (c) 0.0001 to 0.2 part by weight of an ammonium or amine salt of an amino polycarboxylic acid having chelate-forming ability.

Incidentally, the urethane polymethacrylate can be prepared by mixing the three components (a)(i)(1) through (3) in the above described ratio and then subjecting the resulting mixture to addition reaction.

The process for preparation of the anaerobically curable composition according to the present invention comprises the steps of:

(1) adding to 100 parts by weight of the component (a), i.e., the polymerizable mixture, 0.0001 to 0.2 part by weight of the aminopolycarboxylic acid having a chelate-forming ability or an alkali metal salt thereof, and 0.01 to 5 parts by weight of an ammonia water or a volatile organic amine having a boiling point of not higher than 250° C., (2) stirring the resulting mixture at a temperature not higher than 150° C. under normal or reduced pressure while removing volatile components contained therein until the pH of the volatile components is decreased to 9 or lower, and then (3) adding thereto 0.1 to 5 parts by weight of the component (b), i.e. a salt of O-benzoic sulfimide with an amine represented by the general formula I.

DETAILED DESCRIPTION OF THE INVENTION

The urethane polymethacrylate used in the present composition may be prepared by mixing (1) polybutadiene-based liquid rubber containing at least one, preferably two or more hydroxyl groups in its molecule, not less than 70% of 1,4-bonds and 30% or less of 1,2-bonds, (2) a polyisocyanate compound and (3) a hydroxyl group-containing methacrylate in such a ratio that the resulting mixture contains OH groups and NCO groups approximately in an equivalent amount; and then subjecting the mixture to addition-reaction according to a conventional method. Since the urethane polymethacrylate thus prepared has both the urethane-bond and 1,4-polybutadiene bond in its molecule, the resulting composition provides a cured product excellent in elasticity. As a polybutadiene-based liquid rubber containing hydroxyl groups in the molecule and not less than 70% of 1,4-bond may be used a butadiene homopolymer and a copolymer of butadiene with styrene or acrylonitrile both having a number average molecular weight of about 500 to 10,000. The use of a liquid rubber containing less than 70% of 1,4-bond cannot provide a cured product having elasticity to satisfy the object of the present invention.

As the polyisocyanate compound may be used toluylene diisocyanate, hexamethylene diisocyanate and 4,4'-diphenylmethane diisocyanate, as well as a urethane prepolymer obtained by addition reaction of these polyisocyanates with polyhydric alcohols, and the like.

The hydroxyl group-containing methacrylate is exemplified by hydroxyethyl methacrylate, hydroxypropyl methacrylate, hydroxybutyl methacrylate, polyethyleneglycol monomethacrylate, polypropyleneglycol monomethacrylate, glycerine dimethacrylate, trimethylolpropane dimethacrylate and the like.

The polymerizable methacrylate to be copolymerized with the urethane polymethacrylate thus obtained includes well-known monomethacrylates and polymethacrylates. Among them, a monomethacrylate having a molecular weight of 100 to 500 is preferred since it provides a cured product having an excellent elasticity upon copolymerization. A monomethacrylate with a relatively low molecular weight provides a cured product having not only excellent elasticity but also toughness.

Such monomethacrylates are exemplified by methoxyethyl methacrylate, ethoxyethyl methacrylate, n-butoxyethyl methacrylate, phenoxyethyl methacrylate, methoxypolyethyleneglycol methacrylate, lauryl methacrylate, stearyl methacrylate, cyclohexyl methacrylate, 2-ethylhexyl methacrylate, hydroxyethyl methacrylate, hydroxypropyl methacrylate, hydroxybutyl methacrylate, polyethyleneglycol monomethacrylate, polypropyleneglycol monomethacrylate and the like. They may be used alone or as a mixture of two or more of them. Polymethacrylates may also be used, however, in the case that they are used alone, the resulting cured product is apt to become somewhat brittle. Therefore, it is preferable to use a polymethacrylate in combination with the above-mentioned monomethacrylates for the purpose of increasing chemical resistance and thermal resistance.

The mixing ratio of the urethane polymethacrylate having 1,4-polybutadiene bond to the polymerizable methacrylate (a)(ii) is 20–90% by weight of the urethane polymethacrylate to 80–10% by weight of the polymerizable methacrylate. Outside of the range, the viscosity of the resulting polymerizable mixture will become too high or the resulting cured product will become too hard. An especially preferable range thereof is 40–70% by weight of the urethane polymethacrylate to 60–30% by weight of the other polymerizable methacrylate.

By incorporating into 100 parts of the above-mentioned polymerizable mixture, 0.1 to 5.0 parts by weight and preferably 0.5 to 2.0 parts by weight of the salt of o-benzoic sulfimide with the amine of the general formula (I), there is obtained a one-part type anaerobically curable composition which produces a cured product having excellent elasticity without using an organic peroxide. The amine of the formula (I) is exemplified by 1,2,3,4-tetrahydroquinoline, 1,2,3,4,-tetrahydroquinaldine and 6-methyl-1,2,3,4,-tetrahydroquinoline, and the like.

The curable composition thus obtained is added with a gelling stabilizer to give a one-part type anaerobically curable composition excellent in long term storage stability. Normally, a curable composition which contains a urethane polymethacrylate having 1,4-polybutadiene bond was so easily gelled that it was difficult to make it a one-part type composition. Indeed, it has also been difficult for the curable composition consisting of the components (a) and (b) and not containing any organic peroxide to be stabilized even if large amounts of well-known polymerization inhibitors such as hydroquinone, hydroquinone monomethyl ether and benzoquinone, or chelating agents such as acetyl acetone, o-aminophenol, salicylaldehyde, o-mercaptobenzoic acid, pyrocatechol or the sodium salt thereof, oxalic acid and maloic acid are added.

The present inventors have made extensive researches on the stabilization of such curable compositions, and have found that an ammonium or amine salt of an aminopolycarboxylic acid having chelate-forming ability is very useful for this purpose even when it is added in a small amount as low as not more than 0.05 part by weight and that is has no adverse effect upon the performances of the resulting curable composition. The aminopolycarboxylic acid having chelate-forming ability is a chelate-forming polycarboxylic acid that has at least one amine group and a plurality of carboxylic acid groups, such as ethylenediamine tetraacetic acid, diethylenetriamine pentaacetic acid, iminodiacetic acid, cyclohexanediamine tetraacetic acid, nitrilotriacetic acid, glycoletherdiamine tetraacetic acid and the like. They are added in an amount of 0.0001 to 0.2 part by weight, to 100 parts by weight of the polymerizable mixture.

The present inventors have also found that an anaerobically curable composition which has good gelling stability and rapid cure property can be obtained, by adding 0.0001 to 0.2 part by weight of an aminopolycarboxylic acid having chelate-forming ability or an alkali metal salt thereof and moreover 0.01 to 5.0 parts by weight, preferably 0.02 to 1.0 part by weight, of aqueous ammonia or a volatile organic amine having a boiling point of not higher than 250° C. to 100 parts by weight of the polymerizable mixture, stirring the resulting mixture at a temperature of not higher than 150° C., preferably 60° to 100° C., until the pH of the vapors of volatile components including the ammonia or the amine which are removed from the system is decreased to 9 or lower (as measured by using a pH testing paper), and then adding to the mixture thus obtained 0.1 to 5.0 parts by weight of the above-mentioned salt of o-benzoic sulfimide with the amine of the general formula (I).

The mode of action of the ammonia or the amine during the stirring treatment has not been made clear. It is, however, considered that they act to increase the chelate-forming ability of the aminopolycarboxylic acid or the alkali metal salt thereof, to markedly decrease the undesirable effect of heavy metals on the storage stability of the composition and to neutralize unnecessary acid components which also adversely affect storage stability.

When ammonia or amine was simply used, however, the resulting composition has strong alkalinity and was too slow in cure speed to be used as an anaerobically curable composition. In this case, the present inventors have tried to use a volatile alkali which can be readily removed from the system after stabilization, i.e., aqueous ammonia or an organic amine having a low boiling point, and to remove the volatile components from the system at a temperature not higher than 150° C. under normal or reduced pressure, and thus have surprisingly found that there can be obtained an anaerobically curable composition of high performances which is very stable and, moreover, is not decreased in cure speed. As a measure for such removal, it is sufficient to remove the volatile components until the pH of said components escaped out of the system is decreased to 9 or lower by checking the pH at a constant time interval. A temperature exceeding 150° C. is not desired during the removal treatment since thermal polymerization of the monomers may possibly take place at such a high temperature.

The volatile organic amine used in the present invention is not especially restricted as long as it has a boiling point low enough to be removed from the system; however, it has preferably a boiling point of not higher than 250° C. from the viewpoint of the operation. Any primary, secondary or tertiary amines may be employed. Such amines are exemplified by monomethylamine, monoethylamine, n-butylamine, dimethylamine, trimethylamine, diethylamine, triethylamine, dibutylamine, tributylamine, n-hexylamine, etc.

As mentioned above, the anaerobically curable composition according to the present invention, is of one-part type and is rapidly curable and excellent in long-term storage, and provides a cured product having excellent elasticity without addition of an organic peroxide. It exhibits an excellent performance in the application for prevention of leakage of liquids and gases from franges or pipe joints. That is, the composition not only has an excellent chamical-resistance but also exhibits high resistance to external change in temperature, vibrations and impacts. Thus, the composition will largely contribute to the development in the fields where such properties are required.

Incidentally, it is possible, for the purpose of increasing the commercial value of the composition according to the present invention, to incorporate thereto suitable amounts of colorants such as dyes and the like, organic or inorganic thixotropic agents, fillers, thickening agents, plasticizers and the like. Moreover, an organic perixode can be added according to circumstances in a small amount of not more than 0.5 part by weight to 100 parts by weight of the curable composition though it is not necessitated in the present invention.

The present invention will be explained more specifically by way of the following illustrative examples, comparative examples and application examples, in which all parts are by weight.

EXAMPLE 1

A hydroxyl-terminated polybutadiene (known under the trade name Poly bd R-45HT, supplied by ARCO, U.S.A., hydroxyl group content 0.804 meq/g, 1,4-bond content 80%, number average molecular weight 3000–4000), 2,4-toluylene-diisocyanate and hydroxypropylmethacrylate in a molar ratio of 1:2:2.2 are subjected to addition reaction according to a conventional method to give a urethane polymethacrylate [hereinafter referred to an UM (R45HT-TDI-HPM)]. To the mixture of polymerizable components consisting of 50 parts of the UM (R45HT-TDI-HPM) and 50 parts of ethoxyethyl methyacrylate are added 300 ppm of cyclohexanediamine tetraacetic acid and 0.5 part of 28% ammonia water. After stirring at room temperature for 10 minutes, the resulting mixture is further stirred at 80° C. in the open air for 1 hour while removing volatile components including the ammonia to decrease the pH thereof to 9 or lower. Then, 1.5 parts of 1,2,3,4-tetrahydroquinoline salt of o-benzoic sulfimide (hereinafter referred to as SQ salt) is added to the mixture and dissolved therein by heating at 80° C. for 10 minutes to give an anaerobically curable composition. The following physical properties of the resulting composition were determined.

Gelling stability at 50° C.

In a 100 ml polyethylene vessel was placed 50 g of the composition and the days until the composition was thickened or gelled in a oven at 50° C. were measured. The present inventors have confirmed that a composition will be stable at room temperature for one year or more if something unusual is not observed in the composition for 10 days or more under such conditions.

Setting time

M10 steel bolts and nuts degreased with trichloroethylene were bonded with each other by using a composition. The time required until the bolt and nut could not be loosened by the hands (corresponding to a torque strength of about 10 kg-cm) in the course of commencement of adhesion was measured and recorded as the setting time.

Adhesion strength

After curing the above-mentioned bolt and nut which had been bonded with each other and subjecting to aging at 23° C. for 24 hours, the return torque thereof was measured by means of a torque wrench. A torque at which the bonding began to be broken was recorded as a breakloose torque, and an average of the torques at ¼, ½, ¾ and one rotations was recorded as a prevailing torque and breakloose torque/ prevailing torque is shown.

Oil pressure-sealing property

After a ¾" PF aluminum socket and a ¾" PT iron nipple (PF for straight threads for pipes, and PT for taper threads for pipes) were bonded by using a composition and aged at 23° C. for 24 hours, they were set in a oil pressure test fixture (oil: turbine oil) and subjected to an impact caused by pressure and heat by changing the pressure repeatedly from 15 to 30 kg/cm² every 7 seconds and the oil temperature repeatedly from 50° to 70° C. every hour. The time required until the oil began to leak from the bonded portion was measured. A cured product which is excellent in elasticity can follow the changes in pressure and heat and thus exhibits a good sealing property.

Flexing property

The elasticity of a cured product was judged by curing a composition to give a sheet about 1 mm thick and observing cracks and restored state which appears upon folding the sheet by 180 degrees. A sheet which does not have cracks and is restored to the original state on folding is recorded as (O), whereas a sheet which has cracks or breaks on folding is recorded as (X).

The results of the above-mentioned physical properties of the composition are shown in Table 1.

Physical properties of a sheet-like cured product of this composition were also determined to give an elongation of 123%, a tensile strength of 38 kg/cm² and a Shore handness of A 84.

EXAMPLE 2

To a mixture of polymerizable components consisting of 70 parts of UM (R45HT-TDI-HPM) and 30 parts of cyclohexyl methacrylate are added 300 ppm of ethylenediamine tetraacetic acid and 0.5 part of 28% ammonia water. After stirring for 10 minutes at room temperature, the resulting mixture is further stirred at 80° C. in the open air for 1 hour while removing volatile components including the ammonia to decrease the pH thereof to 9 or lower. Then 1.5 parts of SQ salt is added to the mixture and dissolved therein by heating at 80° C. for 10 minutes to give an anaerobically curable composition. The physical properties of the composition thus obtained were measured as in Example 1. The results thereof are shown in Table 1.

The physical properties of a sheet-like cured product of the above composition were also determined to give an elongation of 115%, a tensile strength of 101 kg/cm² and a Shore hardness of A 96.

EXAMPLE 3

To a mixture of polymerizable components consisting of 50 parts of UM (R45HT-TDI-HPM), 20 parts of hydroxypropyl methacrylate and 30 parts of methoxypolyethyleneglycol methacrylate (known under the trade name of NK Ester M-4G, supplied by Shinnakamura Chemical Industries Co. Ltd., Japan) are added 1.5 parts of SQ salt and 300 ppm of diammonium salt of ethylenediamine tetraacetic acid as a gelling stabilizer, and are dissolved therein by heating at 80° C. for 10 minutes to give an anaerobically curable composition. The physical properties of the composition thus obtained were determined as in Example 1. The results thereof are shown in Table 1.

The physical properties of a sheet-like cured product of the resulting composition were also determined to give an elongation of 108%, a tensile strength of 35 kg/cm2 and a Shore hardness of A 81.

Example 4

To a mixture of polymerizable components consisting of 50 parts of UM (R45HT-TDI-HPM), 20 parts of hydroxypropyl methacrylate and 30 parts of lauryl methacrylate are added 150 ppm of ethylenediamine tetraacetic acid and 0.5 part of 28% ammonia water. After stirring for 10 minutes at room temperature, the resulting mixture is further stirred at 80° C. in the open air for 1 hour while removing volatile components including the ammonia to decrease the pH thereof to 9 or lower. Then 1.5 parts of SQ salt is added to the mixture and dissolved therein by heating at 80° C. for 10 minutes to give an anaerobically curable composition. The physical properties of the composition thus obtained were determined as in Example 1. The results thereof are shown in Table 1.

The physical properties of a sheet-like cured product of this composition were also determined to give an elongation of 100%, a tensile strength of 43 kg/cm² and a Shore hardness of A 86.

EXAMPLE 5

To a mixture of polymerizable components consisting of 50 parts of UM (R45HT-TDI-HPM), 20 parts of hydroxyethyl methacrylate and 30 parts of ethoxyethyl methacrylate are added 300 ppm of cyclohexanediamine tetraacetic acid and 0.5 part of 28% ammonia water. After stirring for 10 minutes at room temperature, the resulting mixture is further stirred at 80° C. in the open air for 1 hour while removing volatile components including the ammonia to decrease the pH thereof to 9 or lower. Then 1.5 parts of 1,2,3,4-tetrahydroquinaldine salt of o-benzoic sulfimide (hereinafter referred to as SQN salt) is added to the mixture and is dissolved therein by heating at 80° C. for 10 minutes to give an anaerobically curable composition. The physical properties of the composition thus obtained were determined as in Example 1. The results thereof are shown in Table 1.

The physical properties of a sheet-like product of this composition were also determined to give an elongation of 109%, a tensile strength of 136 kg/cm² and a Shore handness of A 97.

EXAMPLE 6

To a mixture of polymerizable components consisting of 50 parts of UM (R45HT-TDI-HPM) and 50 parts of lauryl methacrylate are added 1.5 parts of SQ salt and 300 ppm of diammonium salt of ethylenediamine tetraacetic acid as a gelling stabilizer, and are dissolved therein by heating at 80° C. for 10 minutes to give an anerobically curable composition. The physical properties thereof were determined as in Example 1. The results thereof are shown in Table 1.

EXAMPLE 7

To a mixture of polymerizable components consisting of 70 parts of UM (R45HT-TDI-HPM) and 30 parts of hydroxypropyl methacrylate are added 300 ppm of cyclohexanediamine tetraacetic acid and 0.5 part of 28% ammonia water. After stirring for 10 minutes at room temperature, the resulting mixture is further stirred at 80° C. in the open air for 1 hour, while removing volatile components including the ammonia to decrease the pH thereof to 9 or lower. Then, 1.5 parts of SQ salt is added to the mixture and dissolved therein by heating at 80° C. for 10 minutes to give an anaerobically curable composition. The physical properties of the composition thus obtained were determined as in Example 1. The results thereof are shown in Table 1.

EXAMPLE 8

To a mixture of polymerizable components consisting of 50 parts of UM (R45HT-TDI-HPM), 20 parts of hydroxyethyl methacrylate and 30 parts of methoxypolyethyleneglycol methacrylate (known under the trade name of NK Ester M-9G, supplied by Shinnakamura Chemical Industries Co. Ltd., Japan) are added 300 ppm of nitrilo triacetic acid and 0.5 part of 28% ammonia water. After stirring for 10 minutes at room temperature, the resulting mixture is further stirred at 80° C. in the open air for 1 hour while removing volatile components including the ammonia to decrease the pH thereof to 9 or lower. Then 1.5 parts of SQN salt is added to the mixture and dissolved therein by heating at 80° C. for 10 minutes to give an anaerobically curable composition. The physical properties of the composition thus obtained were determined as in Example 1. The results thereof are shown in Table 1.

EXAMPLE 9

To a mixture of polymerizable components consisting of 50 parts of urethane polymethacrylate which has been prepared by addition reaction of a hydroxyl-terminated polybutadiene (known under the trade name of Poly bd R-45HT, supplied by ARCO, U.S.A., hydroxyl content: 0.804 meq/g, 1,4-bond: 80%, number average molecular weight: 3000–4000), 2,4-toluylenediisocyanate and hydroxyethyl methacrylate in a molar ratio of 1:2:2.2 according to a conventional method, 20 parts of hydroxypropyl methacrylate and 20 parts of lauryl methacrylate are added 300 ppm of diethylenetriamine pentaacetic acid and 0.45 part of ammonia water. After stirring for 10 minutes at room temperature, the resulting mixture is further stirred at 80° C. in the open air for 1 hour while removing volatile components including the ammonia to decrease the pH thereof to 9 or lower. Then 1.35 parts of SQ salt is added to the mixture and dissolved therein by heating at 80° C. for 10 minutes to give an anaerobically curable composition. The physical properties of the composition thus obtained were determined as in Example 1. The results thereof are shown in Table 1.

EXAMPLE 10

To a mixture of polymerizable components consisting of 50 parts of urethane polymethacrylate which has been prepared by addition reaction of a hydroxyl-terminated polybutadiene (known under the trade name of Poly bd R-45HT, supplied by ARCO, U.S.A., hydroxyl content: 0.804 meq/g, 1,4-bond: 80%, number average molecular weight: 3000–4000) 4,4'-diphenylmethane diisocyanate and hydroxyethyl methacrylate in a molar ratio of 1:2:2 according to a conventional method, 20 parts of hydroxypropyl methacrylate and 30 parts of methoxypolyethyleneglycol methacrylate (known under the trade name of NK Ester M-9G, supplied by Shinnakamura Chemical Industries Co. Ltd., Japan) are added 1.5 parts of SQ salt and 300 ppm of diammonium salt of ethylenediamine tetraacetic acid as a gelling stabilizer and are dissolved therein by heating at 80° C. for 10 minutes to give an anaerobically curable composition. The physical properties of the composition thus obtained were determined as in Example 1. The results thereof are shown in Table 1.

EXAMPLE 11

To a mixture of polymerizable components consisting of 50 parts of urethane polymethacrylate which has been prepared by addition reaction of a hydroxyl-terminated polybutadiene (known under the trade name of Poly bd CS-15, supplied by ARCO, U.S.A., hydroxyl content: 0.645 meq/g, styrene content: 25%, 1,4-bond: 80%, number average molecular weight: 3000-4000), 2,4-toluylene diisocyanate and hydroxypropyl methacrylate in a molar ratio of 1:2:2.2 according to a conventional method [hereinafter referred to as UM (CS15-TDI-HPM)], 20 parts of hydroxypropyl methacrylate and 30 parts of cyclohexyl methacrylate are added 300 ppm of tetrasodium salt of ethylenediamine tetraacetic acid and 0.5 part of ammonia water. After stirring for 10 minutes at room temperature, the resulting mixture is further stirred at 80° C. in the open air for 1 hour while removing volatile components including the ammonia to decrease the pH thereof to 9 or lower. Then 1.5 parts of 6-methyl-1,2,3,4-tetrahydroquinoline salt of o-benzoic sulfimide (hereinafter referred to as SMQ salt) is added to the mixture and dissolved therein by heating at 80° C. for 10 minutes to give an anaerobically curable composition. The physical properties of the composition thus obtained were determined as in Example 1. The results thereof are shown in Table 1.

EXAMPLE 12

To a mixture of polymerizable componets consisting of 50 parts of UM (CS15-TDI-HPM), 30 parts of hydroxypropyl methacrylate and 20 parts of methoxypolyethyleneglycol methacrylate (known under the trade name of NK Ester M-9G, supplied by Shinnakamura Chemical Industries Co. Ltd., Japan) are added 300 ppm of tetrasodium salt of ethylenediamine tetraacetic acid and 0.5 part of 30% aqueous solution of trimethylamine. After stirring for 10 minutes at room temperature, the resulting mixture is further stirred at 80° C. in the open air for 1 hour while removing volatile components including the trimethylamine to decrease the pH thereof to 9 or lower. Then, 1.5 parts of SQ salt is added to the mixture and dissolved therein by heating at 80° C. for 10 minutes to give an anaerobically curable composition. The physical properties of the composition thus obtained are determined as in Example 1. The results thereof are shown in Table 1.

EXAMPLE 13

To a mixture of polymerizable components consisting of 50 parts of urethane polymethacrylate which has been prepared by addition reaction of hydroxyl-terminated acrylonitrilebutadiene copolymer (known under the trade name of Poly bd CN-15, supplied by ARCO, U.S.A., hydroxyl content: 0.614 meq/g, acrylonitrile content: 15%, 1,4-bond: 80%, number average molecular weight: 3000–4000), 2,4-toluylenediisocyanate and hydroxypropyl methacrylate in a molar ratio of 1:2:2 according to a conventional method, 20 parts of hydroxypropyl methacrylate and 30 parts of methoxypolyethyleneglycol methacrylate (known under the trade name of NK Ester M-4G, supplied by Shinnakamura Chemical Industries Co. Ltd., Japan) are added 300 ppm of tetrasodium salt of ethylenediamine tetraacetic acid and 0.5 part of 28% ammonia water. After stirring for 10 minutes at room temperature, the resulting mixture is further stirred at 80° C. in the open air for 1 hour while removing volatile components including the ammonia to decrease the pH thereof to 9 or lower. Then, 1.5 parts of SQ salt is added to the mixture and dissolved therein by heating at 80° C. for 10 minutes to give an anaerobically curable composition. The physical properties of the composition thus obtained were determined as in Example 1. The results thereof are shown in Table 1.

Comparative Example 1

To a mixture having the composition given below, which is generally said to be flexible after curing and to have static sealing effect, were added 1.5 parts of SQ salt, 50 ppm of tetrasodium salt of ethylenediamine tetraacetic acid and 50 ppm of oxalic acid. They were dissolved in the above mixture by heating a 80° C. for 10 minutes to give an anaerobically curable composition. The composition in this example corresponds to a system in which dimethacrylate of ethyleneoxide adduct of bisphenol A was used instead of urethane methacrylate in the present composition.

Composition:

dimethacrylate of 2.6 mol ethyleneoxide adduct of bisphenol A: 50 parts
methoxypolyethylene glycol methacrylate (known under the trade name NK Ester M-9G, supplied by Shinnakamura Chemical Industries Co. Ltd., Japan): 50 parts
thickener (acryl polymer): 8 parts The physical properties of this composition were determined as in Example 1, the results of which are shown in Table 1.

The physical properties of a sheet-like cured product of the above composition were also determined to give an elongation of 10%, a tensile strength of 58 kg/cm$^2$ and a Shore hardness of A 96.

In comparison with compositions according to the present invention, the composition of this example is markedly low in elongation and also inferior in flexing property although it has a Shore hardness approximately equivalent to that of the present composition. It is clear this composition cannot cope with dynamic changes in heat and pressure and there is a large problem as to the oil-pressure sealing property.

TABLE 1

|  | Gelling stability at 50° C. (day) | Setting time (min.) | Adhesive strength (kg-cm) | Oil-pressure sealing property (hr.) | Flexing property |
|---|---|---|---|---|---|
| Example 1 | >10 | 20 | 97/44 | >24 | o |
| Example 2 | " | 80 | 78/18 | " | " |
| Example 3 | " | 20 | 89/35 | " | " |
| Example 4 | " | 35 | 73/28 | " | " |
| Example 5 | " | 10 | 110/58 | " | " |
| Example 6 | " | 50 | 28/12 | " | " |
| Example 7 | " | 40 | 86/23 | " | " |
| Example 8 | " | 45 | 49/18 | " | " |

TABLE 1-continued

|  | Gelling stability at 50° C. (day) | Setting time (min.) | Adhesive strength (kg-cm) | Oil-pressure sealing property (hr.) | Flexing property |
|---|---|---|---|---|---|
| Example 9 | " | 35 | 56/25 | " | " |
| Example 10 | " | 30 | 50/14 | " | " |
| Example 11 | " | 17 | 115/68 | " | " |
| Example 12 | " | 35 | 90/30 | " | " |
| Example 13 | " | 50 | 65/25 | " | " |
| Comparative example 1 | " | 15 | 60/120 | 7 | : |

EXAMPLE 14 & COMPARATIVE EXAMPLES 2 THROUGH 15

To a mixture of polymerizable components consisting of 50 parts of UM (RA45HT-TDI-HPM), 20 parts of hydroxypropyl methacrylate and 30 parts of methoxypolyethylene glycol methacrylate (known under the trade name of NK Ester M-9G, supplied by Shinnakamura Chemical Industries Co. Ltd., Japan) were added 1.5 parts of SQ salt and a predetermined amount of a gelling stabilizer, and the resulting mixture was treated in the manner described below to give an anaerobically curable composition. Gelling stability at 50° C., setting time and adhesion strength of the composition were determined as in Example 1. The results thereof are shown in Table 2.

Method of addition and treatment of the gelling stabilizer

A. SQ salt and a gelling stabilizer are added to a mixture of polymerizable components and are dissolved therein by heating at 80° C. for 10 minutes.
B. A gelling stabilizer and either ammonia water or a volatile organic amine are added to a mixture of polymerizable components. After stirring for 10 minutes at room temperature, the resulting mixture is further stirred at 80° C. in the open air for 1 hour while removing volatile components to decrease the pH thereof to 9 or lower. Then SQ salt is added to the mixture and is dissolved therein by heating at 80° C. for 10 minutes.
C. SQ salt is added to a mixture of polymerizable components and dissolved therein by heating at 80° C. for 10 minutes, followed by adding a gelling stabilizer and either ammonia water or a volatile organic amine and stirring for 15 minutes at room temperature.

As apparent from the results shown in Table 2, good results with respect to long term storage stability and curing properties were obtained only when a gelling stabilizer added is an ammonium or amine salt of an aminopolycarboxylic acid which has chelate-forming ability, or when an aminopolycarboxylic acid having chelate-forming ability, or an alkali metal salt thereof is added together with an ammonia water or a volatile organic amine salt and then stirred while removing volatile components out of the system.

TABLE 2

| No. | Type and amount of gelling stabilizer | | Method of addition and treatment | Gelling stability at 50° C. (day) | Setting time (min.) | Adhesion strength (kg-cm) |
|---|---|---|---|---|---|---|
| Example 1 | diammonium salt of EDTA[1] | 100 ppm | A | >10 | 10 | 83/20 |
| Example 2 | diammonium salt of CYDTA[3] | 300 ppm | " | " | 20 | 79/21 |
| Example 3 | trimethylamine salt of EDTA | 200 ppm | " | " | 18 | 75/28 |
| Example 4 | EDTA4Na[2] 159 ppm, | 0.05 phr | B | " | 10 | 77/21 |

TABLE 2-continued

| No. | Type and amount of gelling stabilizer | Method of addition and treatment | | Gelling stability at 50° C. (day) | Setting time (min.) | Adhesion strength (kg-cm) |
|---|---|---|---|---|---|---|
| Example 5 | EDTA4Na 150 ppm, 28% ammonia water | 0.5 phr | " | " | 15 | 80/16 |
| Example 6 | EDTA4Na 150 ppm, 28% ammonia water | 1.0 phr | " | " | 15 | 71/15 |
| Example 7 | EDTA4Na 150 ppm, 30% aqueous trimethylamine solution | 0.5 phr | " | " | 12 | 79/16 |
| Example 8 | EDTA4Na 150 ppm, triethylamine | 0.2 phr | " | " | 15 | 75/16 |
| Example 9 | EDTA4Na 150 ppm, tributylamine | 0.2 phr | " | " | 15 | 77/18 |
| Example 10 | EDTA 150 ppm, 28% ammonia water | 0.5 phr | " | " | 13 | 76/20 |
| Example 11 | EDTA 150 ppm, diethyl amine | 0.5 phr | " | " | 30 | 80/16 |
| Example 12 | EDTA 150 ppm, n-butyl amine | 0.5 phr | " | " | 30 | 73/17 |
| Example 13 | CYDTA 150 ppm, 28% ammonia water | 0.5 phr | " | " | 20 | 72/20 |
| Example 14 | DTPA[4] 150 ppm, 28% ammonia water | 0.5 phr | " | " | 24 | 79/16 |
| Example 15 | NTA[5] 300 ppm, 28% ammonia water | 0.5 phr | " | " | 30 | 79/18 |
| Comparative example 2 | p-benzoquinone 1000 ppm | | A | 1 | >180 | 22/12 |
| Comparative example 3 | hydroquinone 3000 ppm | | " | " | 70 | 26/7 |
| Comparative example 4 | oxalic acid 150 ppm 28% ammonia water | 0.5 phr | B | " | 15 | 79/18 |
| Comparative example 5 | EDTA4Na 150 ppm | 0.5 phr | A | " | 8 | 74/19 |
| Comparative example 6 | EDTA4Na 150 ppm 28% ammonia water | 0.05 phr | C | 8 | 10 | 78/18 |
| Comparative example 7 | EDTA4Na 150 ppm 28% ammonia water | 0.5 phr | " | >10 | >180 | 15/9 |
| Comparative example 8 | EDTA 150 ppm | | A | 1 | 10 | 82/23 |
| Comparative example 9 | EDTA 150 ppm, diethyl amine | 0.5 phr | C | >10 | >180 | 33/15 |
| Comparative example 10 | CYDTA 150 ppm | | A | 1 | 20 | 72/22 |
| Comparative example 11 | CYDTA 150 ppm, 28% ammonia water | 0.5 phr | C | >10 | >180 | 12/5 |
| Comparative example 12 | DTPA 150 ppm | | A | 1 | 15 | 73/18 |
| Comparative example 13 | DTPA 150 ppm, 28% ammonia water | 0.5 phr | C | >10 | >180 | 9/5 |
| Comparative example 14 | NTA 300 ppm | | A | 1 | 20 | 74/18 |
| Comparative example 15 | NTA 300 ppm, 28% ammonia water | 0.5 phr | C | >10 | >180 | 7/2 |

Notes:
[1]EDTA: ethylenediamine tetraacetic acid
[2]EDTA4Na: tetrasodium salt of ethylenediamine tetraacetic acid
[3]CYDTA: cyclohexanediamine tetraacetic acid
[4]DTPA: diethylenetriamine pentaacetic acid
[5]NTA: nitrilo triacetic acid

Application Example 1

To a mixture of polymerizable components consisting of 35 parts of UM (R45HT-TDI-HPM), 14 parts of hydroxypropyl methacrylate and 21 parts of methoxypolyethylene glycol methacrylate (known under the trade name of NK Ester M-9G, supplied by Shinnakamura Chemical Industries Co. Ltd., Japan) are added 300 ppm of tetrasodium salt of ethylenediamine tetraacetic acid and 0.42 part of 28% ammonia water. Ater stirring for 10 minutes at room temperature, the resulting mixture is further stirred at 80° C. in the open air for 1 hour while removing volatile components including the ammonia to decrease the pH thereof to 9 or lower. Then 1.05 parts of SQ salt is added to the mixture and dissolved therein by heating at 80° C. for 10 minutes, followed by adding thereto 10 parts of polyethylene powder and 20 parts of polytetrafluoroethylene powder as fillers and sufficiently mixing by agitation to produce an gascket. The physical properties of the gascket were determined as in Example 1 to give a gelling stability at 50° C. of 10 days or more, a setting time of 22 minutes, an adhesion strength of 40/12 kg-cm and an oil-pressure sealing property of 24 hours or more. By using the gascket, ⅜" PT iron socket and ⅜" PT hexagon socket head plug (Parkerizing) were bonded with each other and aged for 24 hours. The sealing of the bonded product was measured. There was observed no leakage under oil pressure of 200 kg/cm². The flange-pressure resistance thereof was also measured according to JIS K6820 to show pressure resistance of not less than 100 kg/cm².

What is claimed is:

1. An anaerobically curable composition which consists essentially of the following components (a), (b) and (c):
   (a) 100 parts by weight of polymerizable mixture consisting of the following (i) and (ii):
      (i) 20 to 90% by weight of a urethane polymethacrylate composed of an addition-reaction product of
         (1) a polybutadiene-based liquid rubber containing hydroxyl groups in its molecule and not less than 70% of 1,4-bonds,
         (2) a polyisocyanate compound, and
         (3) a hydroxyl group-containing methyacrylate in such a ratio that the resulting mixture contains OH groups and NCO groups approximately in an equivalent amount, and
      (ii) 80 to 10% by weight of a polymerizable methacrylate,
   (b) 0.1 to 5.0 parts by weight of the salt of o-benzoic sulfimide with an amine represented by the general formula (I):

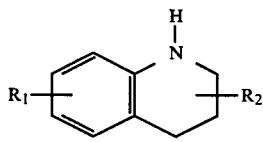

(I)

wherein $R_1$ and $R_2$ each independently stand for hydrogen or methyl group, and
   (c) 0.0001 to 0.2 part by weight of an ammonium or amine salt of a chelate-forming polycarboxylic acid containing at least one amine group and a plurality of carboxylic acid groups.

2. The composition according to claim 1, in which the polymerizable methacrylate of component (a)(ii) is a monomethacrylate having a molecular weight of 100 to 500.

3. The composition according to claim 1, in which the polymerizable mixture (a) consists of 40 to 70% by weight of the urethane polymethacrylate (i) and 60 to 30% by weight of the polymerizable methacrylate (ii).

4. The composition according to claim 1, in which the polybutadiene-based liquid rubber (a)(i) (1) contains 80% of 1,4-bond and has a number average molecular weight of 3000 to 4000.

5. The composition according to claim 1 in which the polyisocyanate compound (a)(i) (2) is selected from the group consisting of toluylene diisocyanate and 4,4'-diphenylmethane diisocyanate.

6. The composition according to claim 1 in which the hydroxyl group-containing methacrylate (a)(i) (3) is selected from the group consisting of hydroxypropyl methacrylate, and hydroxyethyl methacrylate.

7. The composition according to claim 1 in which the polymerizable methacrylate (a)(ii) selected from the group consisting of ethoxyethyl methacrylate, methoxypolyethylene glycol methacrylate, lauryl methacrylate and hydroxypropyl methacrylate.

8. The composition according to claim 1 in which the amine salt of o-benzoic sulfimide (b) is the 1,2,3,4-tetrahydroquinoline salt of o-benzoic sulfimide.

9. The composition according to claim 1 in which the component (c), i.e. a gelling stabilizer is diammonium salt of ethylenediamine tetraacetic acid.

10. A process for preparing an anaerobically curable composition which comprises the steps
   (1) adding 0.0001 to 0.2 part by weight of (c) a chelate-forming polycarboxylic acid containing at least one amino group and a plurality of carboxylic acid groups or an alkali metal salt thereof and 0.01 to 5 parts by weight of aqueous ammonia or a volatile organic amine having a boiling point of not higher than 250° C., to 100 parts by weight of (a) a polymerizable mixture consisting of (i) and (ii):
      (i) 20 to 90% by weight of a urethane polymethacrylate prepared by mixing
         (1) a polybutadiene-based liquid rubber containing hydroxyl groups in it molecule and not less than 70% of 1,4-bonds.
         (2) a polyisocyanate compound, and
         (3) a hydroxyl group-containing methacrylic ester in such a ratio that the resulting mixture contains OH groups and NCO groups approximately in an equivalent amount, and then subjecting the resulting mixture to addition-reaction, and
      (ii) 80 to 10% by weight of a polymerizable methacrylate,
   (2) stirring the resulting mixture at a temperature not higher than 150° C. under normal or reduced pressure, while removing volatile components contained therein until the pH of the volatile components is decreased to 9 or lower, and then
   (3) adding thereto 0.1 to 5 parts by weight of (b) the salt of o-benzoic sulfimide with an amine represented by the general formula (I):

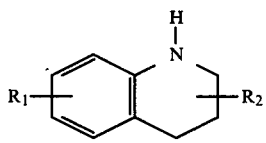

(I)

wherein $R_1$ and $R_2$ each independently stand for hydrogen or methyl group.

11. The process according to claim 10, in which the polymerizable methacrylate (a)(ii) is a monomethacrylate having a molecular weight of 100 to 500.

12. The process according to claim 10, in which the polymerizable mixture (a) consists of 40 to 70% by weight of the urethane polymethacrylate (i) and 60 to 30% by weight of the polymerizable methacrylate (ii).

13. The process according to claim 10, in which the polybutadiene-based liquid rubber (a)(i) 1) contains 80% of 1,4-bond and has a number average molecular weight of 3000 to 4000.

14. The process according to claim 10, in which the polyisocyanate compound (a)(i) (2) is toluylenediisocyanate.

15. The process according to claim 10, in which the hydroxyl group-containing methacrylate (a)(i) (3) is selected from the group consisting of hydroxypropyl methacrylate and hydroxyethyl methacrylate.

16. The process according to claim 10 in which the polymerizable methacrylate (a)(ii) is selected from the group consisting of ethoxyethyl methacrylate, methoxypolyethylene glycol methacrylate, lauryl methacrylate, cyclohexyl methacrylate, hydroxyethyl methacrylate, hydroxypropyl methacrylate and a mixture thereof.

17. The process according to claim 10 in which the chelate-forming polycarboxylic acid or salt thereof is selected from the group consisting of ethylenediamine tetraacetic acid, diethylenetriamine pentaacetic acid, cyclohexanediamine tetraacetic acid, nitrilo triacetic acid and sodium salt or ethylenediamine tetraacetic acid.

18. The process according to claim 10, in which the amine of the formula (I) is selected from the group consisting of 1,2,3,4-tetrahydroquinoline, 1,2,3,4-tetrahydroquinaldine and 6-methyl-1,2,3,4-tetrahydroquinoline.

* * * * *